Sept. 17, 1963  J. W. HICKS, JR., ETAL  3,104,191

METHOD OF MANUFACTURING OPTICAL IMAGE TRANSFER DEVICES

Filed Dec. 19, 1957  2 Sheets-Sheet 1

INVENTORS
JOHN W. HICKS, JR.
WILFRED P. BAZINET, JR.
BY
Louis L. Gagnon
Noble J. Williams
ATTORNEYS

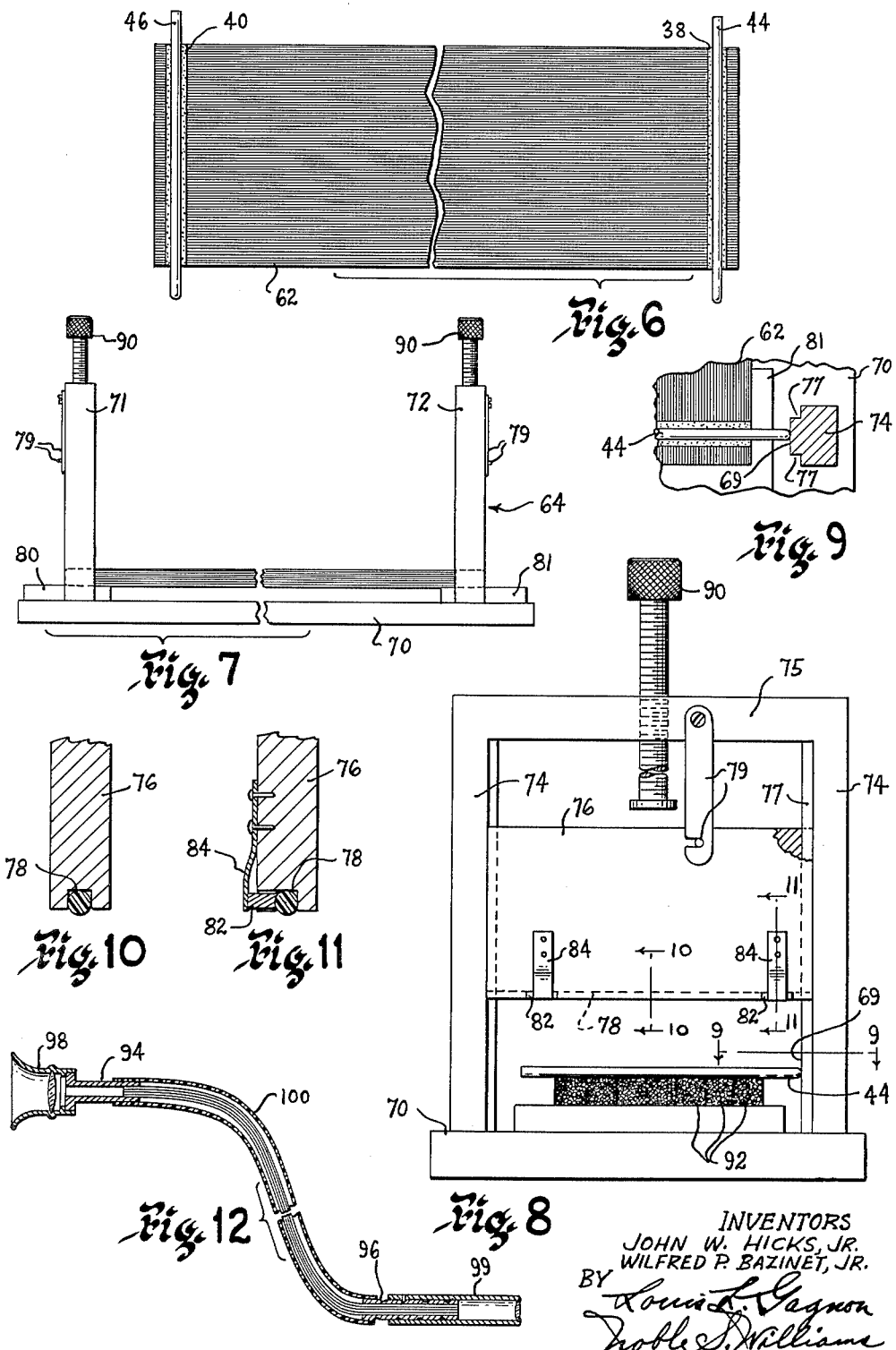

United States Patent Office 3,104,191
Patented Sept. 17, 1963

3,104,191
METHOD OF MANUFACTURING OPTICAL IMAGE TRANSFER DEVICES
John W. Hicks, Jr., Fiskdale, and Wilfred P. Bazinet, Jr., Webster, Mass., assignors to American Optical Company, Southbridge, Mass., a voluntary association of Massachusetts
Filed Dec. 19, 1957, Ser. No. 703,914
6 Claims. (Cl. 156—174)

This invention relates to an improved method of manufacture of optical image transfer devices of the type comprising a very large number of small elongated light-conducting fibers or filaments arranged in side-by-side bunched relation to each other so as to collectively provide light-accepting and light-emitting areas of appreciable sizes at the opposite ends of the devices, said method being such as to produce said devices in a rapid, accurate, and comparatively inexpensive manner while providing in said devices high image resolution and high light-conducting efficiency. The invention also includes improved apparatus for use in carrying out the said method.

While multiple filament or multiple fiber image transfer devices have been made and used heretofore, nevertheless, their methods of manufacture have been expensive and time-consuming to perform and the optical resolution and light-conducting efficiencies obtained thereby have not been as good as might be desired. Two important prerequisites of an optical image transfer device of the character described are that its filaments be very small in cross section so that good image resolution will be obtained and that most of the light accepted by the individual filaments at the entrance end of the device be conducted without appreciable loss through the lengths of the respective filaments to the opposite ends thereof even though each filament is of considerable length.

Even though a great number of internal reflections take place in each filament or fiber, no leakage of light from one filament to a second adjacent filament should occur. Such leakage of light from one filament to another (sometimes called "cross talk"), if present in the device, will occur at points of internal reflection and will not only reduce the amount of light travelling through any single filament but will also tend to deteriorate the quality of the light in any second adjacent filament receiving this light. Accordingly, in filaments of very small cross-sectional size relative to their lengths, a very large number of reflections will occur and if each reflection is not total, an appreciable amount of such "cross talk" will occur throughout the length of a thin filament with the result that the image obtained at the exit end of the device will appear very much "washed out" or altered with respect to the image accepted at the entrance end thereof. This leakage of light or "cross talk" can be prevented by suitably coating or encasing each individual filament or fiber.

Also of extreme importance in the manufacture of such an optical image transfer device is the fact that the individual thin filaments, which may be of such small size as to employ in the neighborhood of 250,000 per square inch of cross-sectional area, be individually and accurately positioned in like manner at the opposite ends of the assembled device. When this is the case, all of the many component portions of the light from the object field entering the entrance end of the device will be correctly arranged relative to one another when emitted from the exit end of the device and a correct appearance will be obtained. Additionally, it should be kept in mind that for high efficiency in such a device, it is desirable to have as much of the entrance area of the device as possible of such shape and character as to accept the light impinging thereon, and thus the coatings of each filament or fiber should be of a minimum thickness.

While in some cases an optical image transfer device of the character described may have utility even though same is formed as a substantially rigid structure, in many other cases, however, it is desirable to have the optical image transfer device so formed that it will be flexible. When flexibility is required, the individual filaments or fibers must be thin enough to accommodate such flexing and should be free of each other intermediate their opposite ends. Devices of the latter type, accordingly, may be used with a considerable degree of freedom for "looking around corners" and examples wherein a considerable amount of flexibility within the image transfer device is desirable would be in the construction of a gastroscope, endoscope or the like.

The method and apparatus of the present invention are such as to enable the manufacture of optical image transfer devices of the above character and with high efficiency, high image resolution and accuracy of image reproduction in a rapid and inexpensive manner.

It is, accordingly, an object of the present invention to provide a method and apparatus for use in the manufacture of optical image transfer devices of the character described having high image resolution, high optical efficiency and accuracy of image reproduction in a rapid and inexpensive manner.

It is also an object of the invention to provide a method and apparatus whereby optical image transfer devices of the character described may be formed which are of a flexible or rigid nature in accordance with the use to which the device is to be put, and which devices, nevertheless, will provide high image resolution and have high optical efficiency in conducting an optical image from one end of the device to the other.

Other objects and advantages of the invention will become apparent from the detailed description which follows when taken in conjunction with the accompanying drawings in which:

FIG. 6 is a plan view of an assembled sheet of filaments or fibers cemented at their opposite ends to a pair of transfer rods;

FIG. 7 is an elevational view showing assembly apparatus for use in forming a bundle of filaments or fibers for use in forming said optical image transfer devices;

FIG. 8 is an enlarged end view of the apparatus of FIG. 7;

FIGS. 9, 10, and 11 are enlarged cross-sectional views taken substantially upon section lines 9—9, 10—10, and 11—11 respectively, of FIG. 8; and FIG. 12 is an optical instrument embodying an optical image transfer device of the character described.

Figure 1:
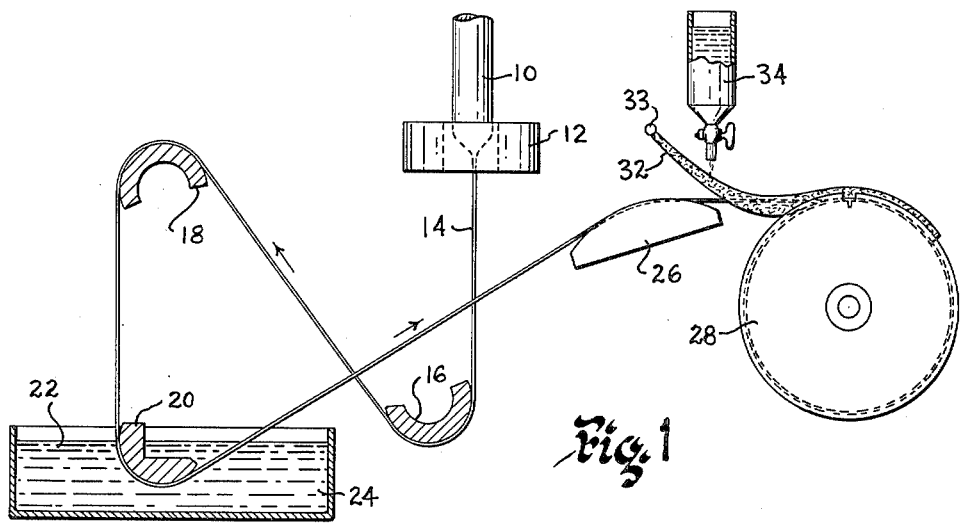
FIG. 1 is a diagrammatic showing of apparatus for use in forming multiple fiber optical image transfer devices of the character described.

Referring to the drawings in detail, it will be seen that numeral 10 in FIG. 1 shows a rod of clear, light-conducting material such as a glass or plastic having a relatively high refractive index and arranged preferably in a vertical position so that the lower end thereof will be located within a hollow electrically energized heating ring (of known construction) or the like 12. When the ring has heated the lower end of the glass or plastic rod sufficiently, a thin thread 14 may be drawn downwardly therefrom and passed about a first polished curved guide 16 and then up and over a second similar guide 18. While this thread, in all cases for best results, will be very fine, nevertheless, its size may be varied appreciably and accurately controlled in size by the rate at which it is uniformly withdrawn from the heated rod 10 and by the temperature at which the lower end of the rod is maintained.

After passing over guide 18, the thread 14 travels downwardly and about a guide 20 which is suitably located so that the thread at such time will be caused to pass, as shown, through a coating solution 22 in a tank 24. The purpose of this solution is to form upon and in optical contact with the outer surface of the thread a very thin continuous enclosing or encircling layer or film of material of relatively low refractive index. Preferably, this coating material will be clear and transparent. Thus, later when this thread is cut into shorter lengths and assembled to form an optical image transfer device, the low index layer will function optically to insulate one thread from an adjacent thread and thus insure total internal reflection of most of the light entering the filaments at one end of the device and travelling therethrough to the opposite ends.

A desirable coating material having a low refractive index and suitable for this coating purpose has been found to be a mixture of tetra-ethyl-ortho-silicate having microscopic particles of silica therein. The coating solution provides a thin continuous layer about the thread 14 and may be formed by using ethyl silicate and suspended silica particles in a solution of hydrochloric acid and ethyl alcohol; and when this solution dries, there will be formed on the thread a uniform coating layer which is very thin, which will adhere firmly thereto, and which will be fairly inert to chemical attack. Of real importance also is the fact that this coating layer will have a very low index of refraction and will be in optical contact with the high index material forming the thread so that total internal reflection will occur at all locations therein. For a more detailed description of such an optical image transfer device employing a multiplicity of thin coated filaments or fibers, reference is made to co-pending O'Brien application Serial No. 469,877, filed November 19, 1954. This application issued March 4, 1958 as Patent No. 2,825,260. Also, this low index coating material is such that certain glues which are used in the herein-described method and mentioned below will adhere well thereto. While the thickness of the coating layer is very small and may be varied somewhat as different uses require, nevertheless, this layer can be easily altered, by control of the solvents of the solution, so as to provide a thin or very thin layer which may be in the neighborhood of ⅛ to ½ of a wave length in thickness when dry. (Thus, a very small part of the total cross-sectional area of all of the coated threads or filaments of a bundle will be actually occupied by the coating material surrounding the individual filaments.) Another coating material which may be used in like manner would be polyvinyl silicate in a solvent of ethyl alcohol which likewise, after drying, will form upon the thin thread a very thin continuous encasing film or layer.

As the coated thread leaves the tank 24, the applied coating material will dry rapidly and form a continuous enclosing low index layer of silica about the thread. The thread or filament then passes upwardly over a curved guide 26 which has a shallow U-shaped groove therein. The leading end of the coated thread or filament is anchored to a mandrel or drum 28 carried on a machine lathe or the like (not shown) so that as the mandrel 28 is rotated at a uniform preselected speed, successive convolutes or turns of the coated thread or filament will be wound thereon. The U-shaped groove guide 26 will be, at this time, suitably secured to and carried by a movable carriage (not shown) of the machine lathe so as to be driven in a direction parallel to the lathe bed and axis of rotation of the lathe by said carriage movement; being produced by conventional carriage traversing mechanism of the lathe so as to cause the carriage and guide 26 to move sidewise at a very slow, uniform rate. The rate at which the carriage will be moved, of course, will be such that the thread or filament being placed on the mandrel will wind a substantially closed helix on the mandrel. The diameter of the drum or mandrel 28 which will be employed for winding the helix will be chosen in accordance with the length of fibers desired for forming the image transfer device, as will presently appear from the description which follows, and the thinness of the coated thread will depend somewhat upon the surface curvature of the drum 28 so that breaking of the thread will not occur.

Figure 2:
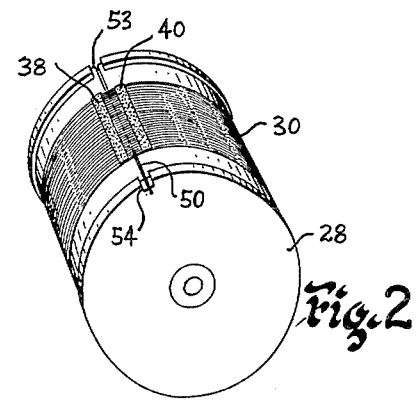
FIG. 2 is a perspective view of the mandrel or drum of FIG. 1 upon which has been wound a thread or filament for use in forming such devices.

Such a mandrel having a helix 30 wound thereon is shown in FIG. 2. For reasons which will later appear, it is desirable to have the successive turns or convolutes of the helix closely adjacent one another. However, considerable difficulty has been experienced in obtaining such a result with either glass or plastic when used as the thread forming material since it was found that both acquired static electrical charges during the winding operation and such static charges tended to separate the convolutes. Also, both glass and plastic threads exhibit high coefficients of friction which tend to prevent sliding of the successive turns or convolutes of thread into closely adjacent relation to the immediately preceding turn or convolute on the mandrel without having this friction tend to produce a twist in the free portion of the thread approaching the mandrel.

It has been found, after considerable experimentation, that the difficulties mentioned above will be substantially completely overcome by the use of a soft, light-weight cloth 32 moistened with a suitable liquid and arranged in the following manner. The cloth is secured at one end as at 33 above the curved guide 26 and allowed to drape over the coated thread traveling towards the mandrel 28 and also over an appreciable part of the top of the mandrel, as shown in FIG. 1. During winding of the thread on the mandrel, the cloth is continuously wet by a fast-drying liquid, such as a mixture of alcohol and water, and thus a wet-drag and lubricating condition will be produced not only upon the portion of the coated thread approaching the drum 28 but also upon a number of the most recently formed turns or convolutes on the drum.

The results of such an arrangement are such that even though the coated thread may approach the mandrel at the correct pitch or helix angle or at a slightly less or at a slightly greater angle, nevertheless, twisting of the thread will be materially reduced or even eliminated and static electrical charges will be prevented. Also the convolutes upon the drum, after drying of the wetted portions, will be positioned in closely adjacent relation to one another whereby a closed helix will be formed. It is not known exactly what produces the desirable results obtained by the use of such a cloth and wetting agent; that is, whether it is the lubricating effect and the reduction of the coefficient of friction, or the surface tension of the wetting liquid during drying of the convolutes, or the drag effect of the wet cloth upon the free portion of the thread and upon the upper surface of the convolutes on the drum, or even creeping of the convolutes, or a combination of all of these factors which are responsible. Nevertheless, it should be appreciated that even though slight spaces may occur between the thread being laid on the drum and the preceding convolutes, by the time the convolutes have been formed and the wetting agent has completely dried therefrom, the convolutes of the helix will be in adjacent continuous contacting relation to one another and free from twist therein.

Thus, the thread may be supplied to the drum or mandrel 28 at angles varying slightly from the exact helix angle, and the angle of approach is far less critical than it was previously. It has also been found that higher speeds of winding of the helix may be employed with satisfactory results when the wetting liquid and cloth are employed.

The container 34 is shown in FIG. 1 suitably positioned about the cloth 32 and is provided with a valve so that a slow dripping of the liquid onto the cloth may be used to maintain the cloth in a suitably moistened condition. The container, of course, will travel lengthwise of the lathe as the guide 26 and lathe carriage move. The wet cloth 32 also serves the useful purpose of removing all particles of dust or the like from the surface of the coated thread before same reaches the mandrel 28.

The size of drum or mandrel 28 may be chosen in accordance with the total length desired in a finished image transfer device to be formed therefrom, and the reason for this is that in carrying out the present method, each formed helix will be removed from the mandrel by cutting same along a line parallel to the axis of the drum. However, before removal of the helix can be correctly performed, the helix 30 is successively treated along two spaced parallel strips or areas 38 and 40, indicated in FIG. 2, with two basically different dimensionally stable glues or cements. First, a cement such as polyvinyl alcohol is applied to both areas. After this first cement or glue has thoroughly dried, a second different cement or glue, such as cellulose nitrate, is applied to the same areas.

Figure 3:
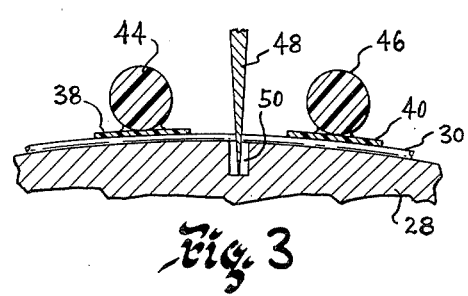
FIG. 3 is an enlarged sectional view of a part of the mandrel and coil of FIG. 2 showing a helix wound thereon.

The purpose of the first-applied cement or glue is to serve in binding the parallel fibers of a single layer together. This glue is water-soluble but insoluble in acetone. On the other hand, the second-applied cement or glue, which is soluble in acetone but not readily affected by water, serves the purpose of temporarily adhering a pair of round transfer rods 44 and 46 to the coated areas, as indicated in FIG. 3. It also serves the purpose later on of adhering successive layers together to form a stack or bundle. By use of transfer rods 44 and 46, it will be possible to lift the 400 or 500 adjacent parallel lengths of thread per inch of width of the helix off of the drum 28 as a single layer as soon as a cutting blade, such as shown at 48, is drawn in an axial direction along a narrow cutting groove 50 in drum 28.

Figure 4:
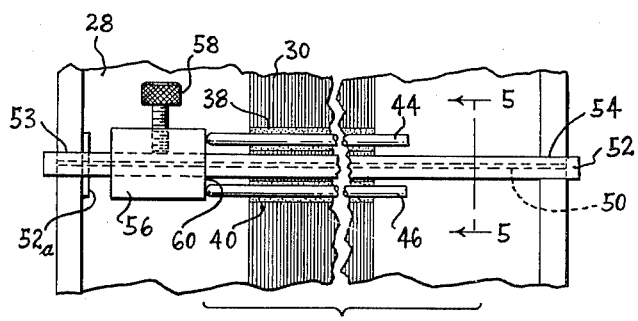
FIG. 4 is a fragmentary plan view of a part of the mandrel of FIG. 2 and aligning apparatus for use therewith.
Figure 5:
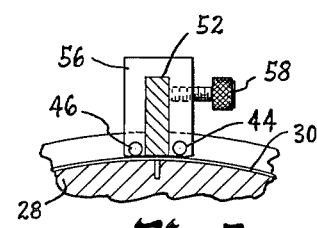
FIG. 5 is a fragmentary sectional view taken substantially upon section line 5—5 of FIG. 4 and looking in the direction of the arrows.

As stated previously, it is of utmost importance that even though the number of filaments per square inch of cross-sectional area in an image transfer device to be formed from many such layers of filaments may be very high (as much as 250,000 per square inch), nevertheless, the arrangement of all of these individual filaments or fibers at the opposite ends of the device should be substantially identically arranged. This is necessary in order that good image reproduction will be obtained. For this reason, there is shown in FIG. 4, apparatus in the form of an alignment bar 52 of such width and length as to extend entirely the length of the drum 28 and to fit closely within a pair of notches 53 and 54 formed in the peripheral flanges of the drum at the opposite ends thereof. This alignment bar 52 may, at such time, rest upon the exposed surface of the helix 30 and when a suitable adjustable alignment block 56 is slipped into place in straddling relation with the bar 52, as clearly indicated in FIGS. 4 and 5, and secured by a set screw 58 or the like, an accurately formed reference surface 60 will be provided. Reference surface 60, in fact, lies in a plane perpendicular to the axis of drum 28 and thus will be in substantially parallel relation to the convolutes on the helix. A pin 52a laterally locates bar 52.

Accordingly, if the transfer rods 44 and 46 are placed upon the cemented areas 38 and 40 immediately after each area has been wiped with a solvent such as acetone and if these rods are, at such time, disposed parallel to the bar 52 and have their rounded reference ends maintained in contact with this reference surface 60 until the solvent has dried, it will be possible to then remove the bar 52 and block 56 from the drum. Thereafter, by drawing a cutting blade along the narrow cutting groove 50 and unwrapping the helix 30 from the drum, a sizeable "sheet" or layer of many fine parallel fibers temporarily held in properly arranged relation to each other at their ends by the transfer rods 44 and 46 will be obtained.

Such an assembly sheet or layer of many fine parallel fibers in side-by-side relation is indicated at 62 in FIG. 6 and with the rods 44 and 46 secured at the opposite ends thereof. It will be appreciated from inspection of this figure that the rounded ends of the rods 44 and 46 which previously engaged the reference surface 60 are now available so that the layer may be positioned in an assembly apparatus 64, such as shown in FIGS. 7 and 8, with the rounded reference ends of the rods 44 and 46, respectively, in engagement with a pair of reference surfaces thereon.

The assembly apparatus of FIGS. 7 and 8 comprises a supporting base 70 to which is secured a pair of similar upright U-shaped frames 71 and 72. Each frame, as shown in FIG. 8, is formed by a pair of vertically disposed guide members 74 connected together at their upper ends by a horizontal member 75. The guide members 74 are grooved at 77 (see FIG. 9) so as to receive and guide the opposite vertically grooved end wall of member 76 arranged in straddling relation thereto. This weighted member 76 thus will be guided in its vertical sliding movement and may be retained in its raised position by pivoted hook and pin means 79.

As will be clear from FIGS. 10 and 11, each movable weight 76 is provided along its lower edge with a groove 78 into which a transfer rod 44 or 46 may partially fit. Accordingly, when the assembly shown in FIG. 6 has been positioned with its opposite rod supported ends upon a pair of glass supporting blocks 80 and 81 in the apparatus of FIG. 7, each weight-like member 76 may be lowered to confine one of the rods. Of course, the distance between the grooves 78 in the weighted members 76 in frames 71 and 72 will be arranged to correspond to the spacing between rods 44 and 46 cemented to the layer 62. An accurately formed inwardly-facing reference surface 69 is provided on each of the frames 71 and 72, so that when the rods 44 and 46 are in position on the blocks 80 and 81, the reference ends of the two rods may be moved laterally into contact with the reference surfaces 69. In order to accurately locate the helix 30 on the drum 28 and thus with regard to the reference ends of the rods 44 and 46 and also correctly control the width of the helix being formed, it is convenient to use on the drum 28 a pair of reference lines (not shown) between which the helix will be formed.

In FIG. 8 is shown a pair of latch-like members 82 fitting into small openings in the opposite lower corners of the vertically movable member 76. Each latch member 82 is rounded at its inner end (see FIG. 11) for engagement with a rod 44 or 46, and each is urged inwardly by a supporting spring 84 secured to the movable member 76. Thus, if either member 76 is raised, the respective rod 44 or 46 gripped thereby will be raised. Accordingly, it is possible to fit the rods 44 and 46 in the grooves 78, raise the members 76 and the layer 62 also and apply to the blocks 80 and 81 a suitable cement. Thereafter, each movable member 76 and the assembled sheet or layer will be lowered and the weight allowed to remain upon the layer until the cement has dried. The latches may then be released and the weight-like members raised. Thereafter, if a small amount of acetone is wiped along the rods 44 and 46, it is a very simple matter to soften the cement sufficiently to allow the rods to be removed without having any fibers loosen from the glass blocks. On the contrary, the sheet or layer 62 of many parallel filaments or fibers will remain secured in place.

Thereafter, the process steps, already enumerated, are repeated to form a second sheet or layer of many coated filaments or fibers which are likewise secured to transfer rods and thereafter transferred as a unit to the assembly apparatus of FIG. 7. In a similar manner, this sheet or layer is adhered at its opposite ends to the upper surface of the preceding sheet or layer of filaments or fibers to produce the second layer of the stack or bundle being formed. These process steps are repeated a large number of times, that is, until a sufficient thickness is provided in the assembled bundle in accordance with the cross-sectional area and dimensions required in the optical instrument or device to be formed from the assembly or from subdivisions thereof.

After a sufficient number of layers have been stacked in this manner, the opposite ends of the weight-like members 76 of FIG. 7, will be firmly clamped in place by use of thumb screws 90 and allowed to remain in this position while both ends of the assembly of filaments or fibers are thoroughly saturated with acetone and allowed to dry to insure a firm bonding between all adjacent filaments or fibers. Thereafter, when the cemented assembly has been removed from the apparatus (of FIGS. 7 and 8) the stack may be sub-divided into a number of separate units as indicated at 92, each having, for example ⅜" x ½" cross-sectional area.

It has been found, for example, that a gastroscope having cross-sectional dimensions of ⅜" x ⅜" may be formed and used with satisfactory results insofar as observing interior wall surfaces of a person's body, or the like, are concerned. Accordingly, in forming devices of this type, it would be only necessary to build up a sufficient number of sheets of parallel fibers to produce a thickness of ⅜ of an inch, and later on when the assembly is removed from the apparatus of FIG. 7, sever the stack lengthwise into a number of ⅜ inch size portions.

When separate units or bundles have been formed, the opposite ends thereof will be suitably ground and polished, or alternatively an end may be pressed into a suitable epoxy resin contained within a small, rigid enclosing metal or plastic collar, such as indicated at 96 in FIG. 12, and allowed to dry thoroughly, so that the ends of the bundle of fibers will be thus completely surrounded and retained in its metal or plastic collar by said resin. Thereafter, the end of the bundle so mounted in collar 96 may be ground and polished. This grinding and polishing of the bundle makes the bundle readily receptive to the transmission of light through the squared off ends of the individual fibers thereof. The metallic or plastic collars surrounding the epoxy resin embedded bundle of fibers may be arranged to serve as mounting means for optical components, as indicated in FIG. 12, wherein a convergent eye lens and mount 98 are suitably supported on the enlarged end of collar 94 and a conventional objective lens and mount 99 are adjustably positioned by screw thread means upon the outer surface of the collar 96. Surrounding the bundle of fiber and anchored to the collars 94 and 96 is a flexible protective plastic tubing 100.

While both glass and plastics have been referred to previously for use in forming the thin flexible thread 14, it is pointed out that glass is preferred since the necessary controls with reference to the drawing of uniform thin threads of different preselected sizes are less critical and a more stable end product is obtained.

Having described our invention, we claim:

1. The method of forming a relatively long flexible optical image transfer device embodying a very large number of relatively long, thin flexible fiber elements each comprising a core of transparent material having a coating thereon of a material of an index of refraction lower than the index of refraction of said material of the core and having opposite end portions of desired cross-sectional size and similar geometrical arrangements comprising winding a continuous fiber of such character upon a mandrel and in such manner as to form a helix embodying a single layer comprising a large number of fiber convolutes in closely packed side-by-side relation with each other, securing all of said convolutes together throughout a pair of adjacent transverse areas of said helix and attaching a pair of transfer members to each of said areas in relatively closely spaced relation to each other and in such manner as to extend transversely of said helix, cutting through said convolutes between said transfer members to allow said helix to be unwrapped from said mandrel, unwrapping said cut helix and extending the same to form a first flexible layer of individual fiber elements having the opposite end portions of all of the fiber elements held together in substantially parallel side-by-side intimate relation and with said transfer members attached thereto, positioning and securing said first extended layer upon supporting means with said transfer members located in an established relationship with said supporting means, removing said transfer members from said layer, forming in like manner a plurality of substantially identical extended layers having transfer members thereon, assembling said plurality of layers by stacking one after another upon the previously positioned layer by placing the transfer members thereof in said established relationship relative to said supporting means to thereby position the axes of the fiber elements of each successive layer at the secured opposite end portions thereof in accurately superimposed and aligned parallel relation to the axes of the fiber elements of said first layer at the respective secured opposite end portions thereof, securing each successive layer to the preceding layer adjacent said opposite ends thereof, removing said transfer members from the secured layer and repeating said assembling steps a number of times sufficient to produce a final secured-together stack of extended layers having end thicknesses approximately equal to that desired of said optical image transfer device.

2. The method of forming a plurality of relatively long flexible optical image transfer devices comprising a very large number of relatively long thin flexible filaments of small cross-sectional size having their opposite end portions similarly geometrically arranged and secured together in side-by-side bunched relation and their intermediate portions free, said method comprising heating a bar of light-conducting material having a relatively high index of refraction to a softening temperature and withdrawing from said bar a very thin continuous flexible thread and during said continuous withdrawing, forming a thin coating of material of a relatively low index of refraction about said thread, winding said coated thread upon a mandrel in such a manner as to form a single layer helix of many closely adjacent convolutes, accurately locating and cementing a pair of transfer members to closely adjacent spaced areas of said helix in such a manner as to be secured to and extend transversely of each of said convolutes, cutting the convolutes of said helix intermediate said members so as to allow said helix and members to be unwrapped from said mandrel and form between said cemented areas a flexible layer of generally straight parallel filaments held in side-by-side relation at their opposite ends by said members, positioning said members and said layer upon supporting means and in exact predetermined relation laterally relative to said means, and adhering the opposite end portions of said layer to said supporting means, removing said members from said layer, repeating the preceding method steps for forming like flexible layers and securing each layer at its opposite ends to the preceding layer upon the supporting means a suitably large number of times so as to produce upon said supporting means a stack of layers of filaments of the thickness desired, bonding the adjacent end portions of all of the filaments at each end of the stack together so as to cause the end portions only of the adjacent filaments to be secured together, removing said stack from said supporting means and longitudinally severing said stack into a plurality of compact groups of assembled filaments each having a cross-sectional area sufficient to produce an optical image transfer device having entrance and exit areas of the predetermined size desired.

3. The method of forming a plurality of relatively long flexible optical image transfer devices comprising a very large number of relatively long thin flexible filaments of very small cross-sectional size having their opposite end portions similarly geometrically arranged and secured together in side-by-side bunched relation and their intermediate portion free, said method comprising heating a bar of light-conducting material having a relatively high refractive index to a softening temperature and withdrawing from said bar a thin continuous flexible thread, and during said continuous withdrawing, forming a continuous outer encircling film of a transparent material having a relatively low refractive index in optical contact with said thread, winding said thread after said coating has hardened upon a mandrel in such a manner as to form a single layer helix of many closely adjacent convolutes, accurately locating and cementing a pair of transfer members to closely adjacent spaced areas of said helix in such a manner as to be secured to and extend transversely of each of said convolutes, cutting the convolutes of said helix intermediate said members so as to allow said helix and members to be unwrapped from said mandrel and form between said cemented areas a flexible layer of generally straight parallel filaments held in side-by-side relation at their opposite ends by said members, positioning said members and said layer upon supporting means and in exact predetermined relation laterally relative to said means, and adhering the opposite end portions of said layer to said supporting means respectively, removing said members from said layer, repeating the preceding method steps for forming like flexible layers and securing each layer at its opposite ends to the preceding layer upon the supporting means a suitably large number of times so as to produce upon said supporting means a stack of layers of filaments of the thickness desired, bonding the adjacent end portions of all of the filaments at each end of the stack together so as to cause the end portions of the adjacent filaments to be secured together, removing said stack from said supporting means and longitudinally severing said stack into a plurality of compact groups of assembled filaments each having a cross-sectional area sufficient to produce an optical image transfer device having entrance and exit areas of the predetermined size desired.

4. The method of forming a plurality of relatively long flexible optical image transfer devices comprising a very large number of relatively long thin flexible filaments of small cross-sectional size having their opposite end portions similarly geometrically arranged and secured together in side-by-side bunched relation and their intermediate portions free, said method comprising heating a bar of clear transparent glass to a softening temperature and withdrawing from said bar a very thin continuous flexible thread and, during said withdrawing, forming a thin coating of a material of a lower index of refraction than the material of said thread in surrounding optical contact with said thread, winding said coated thread upon a mandrel in such a manner as to form a single layer helix of many closely adjacent convolutes, accurately locating and cementing a pair of rigid transfer members to closely adjacent spaced areas of said helix in such a manner as to be secured to and extend transversely of each of said convolutes, cutting the convolutes of said helix intermediate said members so as to allow said helix and transfer members to be unwrapped from said mandrel and form between said cemented areas a flexible layer of generally straight parallel filaments held in side-by-side relation at their opposite ends by said members, positioning said members and said layer upon supporting means and in exact predetermined relation laterally relative to said means, and adhering the opposite end portions of said layer to said supporting means respectively, removing said members from said layer, repeating the preceding method steps for forming like flexible layers and securing each layer at its opposite ends to the preceding layer upon the supporting means a suitably large number of times so as to produce upon said supporting means a stack of layers of coated filaments of the thickness desired, bonding the adjacent end portions of all of the filaments at each end of the stack together so as to cause the end portions of the adjacent filaments to be secured together, removing said stack from said supporting means, forming an optically finished surface on said end portions and longitudinally severing said stack into a plurality of compact groups of assembled filaments each having a cross-sectional area sufficient to produce an optical image transfer device having entrance and exit areas of the predetermined size desired.

5. The method of forming a plurality of relatively long flexible optical image transfer devices comprising a very large number of relatively long thin flexible filaments of small cross-sectional size having their opposite end portions similarly geometrically arranged and secured together in side-by-side bunched relation and their intermediate portions free, said method comprising heating a bar of clear transparent glass having a relatively high refractive index to a softening temperature and withdrawing from said bar a very thin continuous flexible thread, coating said thread with a continuous outer encircling film of material selected from the group consisting of polyvinyl silicate and tetra-ethyl-ortho-silicate and having a relatively low refractive index, winding said thread after said coating has hardened upon a mandrel in such a manner as to form a single layer helix of many closely adjacent convolutes, accurately locating and cementing a pair of rigid transfer rods to closely adjacent spaced areas of said helix in such a manner as to be secured to and extend transversely of each of said convolutes, cutting the convolutes of said helix intermediate said rods so as to allow said helix and transfer rods to be unwrapped from said mandrel and form between said cemented areas a flexible layer of generally straight parallel coated filaments held in side-by-side relation at their opposite ends by said rods, positioning said rods and said layer upon spaced supporting blocks and in exact predetermined relation laterally relative to said blocks, and adhering the opposite end portions of said layer to said blocks respectively, removing said rods from said layer, repeating the preceding method steps for forming like flexible layers and securing each layer at its opposite ends to the preceding layer upon the blocks a suitably large number of times so as to produce upon said blocks a stack of layers of coated filaments of the thickness desired, treating the adjacent end portions of all of the coated filaments at each end of the stack together so as to cause the end portions only of the adjacent coated filaments to adhere together, removing said stack from said blocks and longitudinally severing said stack into a plurality of compact groups of coated assembled filaments each having a cross-sectional area sufficient to produce an optical image transfer device having entrance and exit areas of the predetermined size desired.

6. The method of forming a relatively long flexible optical image transfer device embodying a very large number of relatively long thin flexible fiber elements each comprising a core of transparent material having a coating thereon of a material of an index of refraction lower than the index of refraction of said core and having opposite end portions of desired cross-sectional size and similar geometrical arrangements comprising winding a continuous fiber of such character upon a mandrel and in such manner as to form a single layer helix comprising a large number of fiber convolutes in closely packed side-by-side relation with each other, securing all of said convolutes together at a pair of adjacent transversely extending portions of said helix, cutting said convolutes transversely between said secured portions to allow said helix to be unwrapped from said mandrel and extended to form a flexible layer of individual fiber elements having their opposite end portions held together in closely packed generally parallel side-by-side relation with each other by said secured portions, forming a plurality of such extended layers of substantially the same uniform length and width by repeating the above steps, positioning one layer after another of said plurality of layers in superimposed stacked relation with the preceding layer, so as to dispose the axes of the fiber elements of each successive layer at the secured-together opposite end portions thereof in accurately superimposed and aligned parallel relation to the axes of the fiber elements of the preceding layer at the respective secured-together opposite end portions thereof, and attaching said accurately superimposed opposite end portions to the end portions of the preceding layer to thereby effect substantially the same identical geometric arrangement of fiber elements at the opposite ends of said flexible image transfer device.

References Cited in the file of this patent
UNITED STATES PATENTS

| | | |
|---|---|---|
| 2,726,185 | Howald | Dec. 6, 1955 |
| 2,728,972 | Drummond et al. | Jan. 3, 1956 |
| 2,778,763 | Novak | Jan. 22, 1957 |
| 2,825,260 | O'Brien | Mar. 4, 1958 |
| 2,877,368 | Sheldon | Mar. 10, 1959 |

OTHER REFERENCES

Hopkins et al., "Transparent Fibers for the Transmission of Optical Images," Optica Acta, vol. 1, No. 4, February 1955, pages 164–170.